Jan. 20, 1931.                M. O. TEETOR                1,789,570
PISTON AND PISTON RING
Filed Nov. 5, 1925
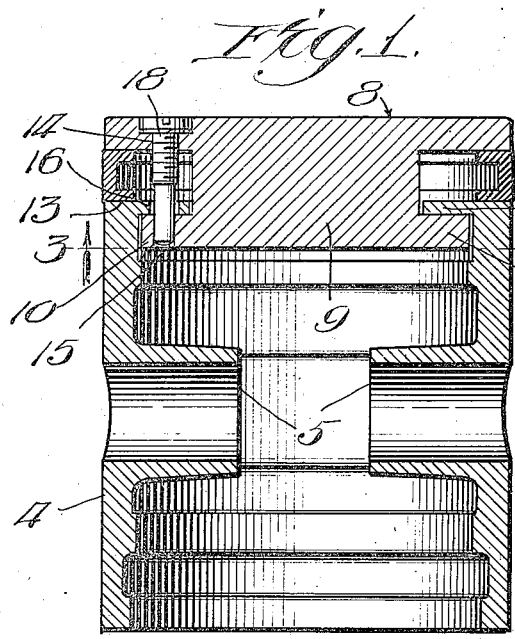
Fig.1.
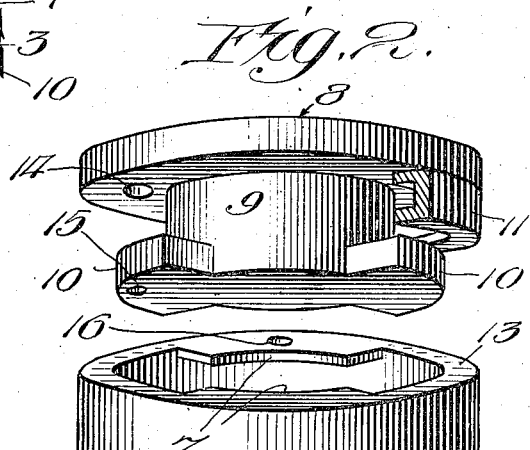
Fig.2.
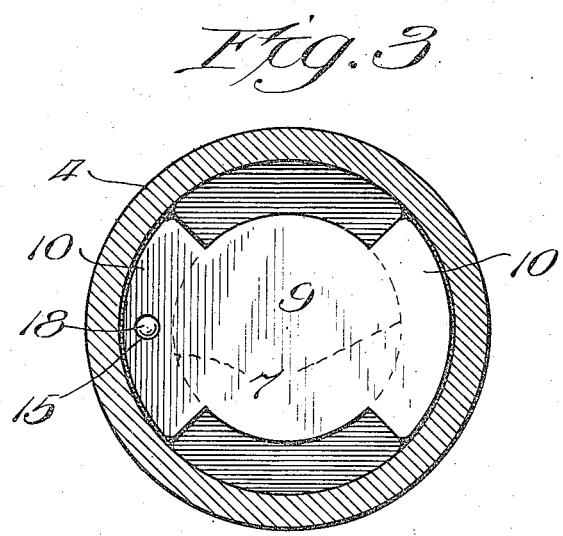
Fig.3.
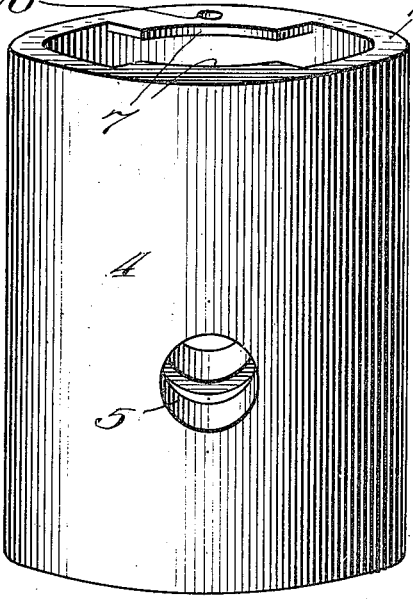
Inventor:
Macy O. Teetor.
By Rector, Hibben, Davis and Macauley
Attys Patented Jan. 20, 1931

1,789,570

UNITED STATES PATENT OFFICE

MACY O. TEETOR, OF HAGERSTOWN, INDIANA, ASSIGNOR TO THE PERFECT CIRCLE COMPANY, OF HAGERSTOWN, INDIANA, A CORPORATION OF INDIANA

PISTON AND PISTON RING

Application filed November 5, 1925. Serial No. 66,919.

My invention relates to pistons and piston rings and more particularly to means for sealing the piston ring in the groove in the piston.

The principal object of my invention is to provide a novel and simple construction for clamping the piston ring between the head and body of the piston for the purpose of sealing it at its edges and thus prevent the leakage of fluid behind the ring.

More particular, I provide a head which is so attached to the body of the piston that movement of the head towards the piston is restrained only by the piston ring against which the head engages while movement of the head in the opposite direction is positively limited by the form of connection employed.

Still another object of my invention is to provide novel means for connecting the head to the piston body.

With the above and other incidental objects in view which will appear from the following description, my invention consists in certain novel features of construction and combination of parts, the essential elements whereof are described in detail hereinafter and illustrated in the accompanying drawings.

In said drawings, Figure 1 is a vertical cross section taken through a piston and piston ring illustrating the preferred form of embodiment of my invention; Fig. 2 is a perspective view showing the head and body of the piston ring in separated relation; and Fig. 3 is a cross section through the piston as on the line 3—3 of Fig. 1.

Referring to the drawings, the lower portion of the body 4 of the piston is of the usual conventional form. The body is provided with the ordinary bosses 5 for receiving the wrist pin for connecting the connecting rod to the piston. The upper end of the body is open and is provided with oppositely-positioned inwardly-extending segmental projections or wings 7. The head 8 is preferably in the form of a disk provided with a central depending integral boss 9 having oppositely-positioned outwardly-extending segmental projections or wings 10. The piston ring 11 is preferably channel-shaped in cross section but it may be plain or of any other desirable cross-sectional contour. When the parts are to be assembled, the ring 10 is seated on the upper edge or seat 13 of the body of the piston and then the head 8 is brought into engagement with the upper edge of the ring by inserting the projections 10 into the body between the projections 7. The head is then given a quarter turn to bring the projections 10 under the correspondingly shaped projections 7 and to bring an aperture 14 in the head and an aperture 15 in one of the wings 10 into registry with an aperture 16 in one of the projections 7. Finally, a screw 18 is screwed into the threaded opening 14, the plain reduced lower end of the screw then projecting through the aperture 15 and into the aperture 16 to prevent rotation of the head with respect to the body of the piston.

Merely for the sake of explanation of the operation, it might be assumed that the piston is employed in a four-cycle internal combustion engine. It will be obvious that while pressure (called "fluid pressure" herein) is exerted on the head by the gases in the combustion space during the compression, explosion and exhaust strokes of the piston, the head is forced firmly against the piston ring, the lower edge of the ring then being clamped against the seat 13. As there is a free connection between the head and the body, that is a connection which does not resiliently or otherwise restrain the movement of the head towards the body, it will be obvious that the pressure exerted on the head is fully applied to the piston ring thus effectually sealing the ring at its edges to prevent all leakage of fluid past the edges of the ring. The greater the fluid pressure the better the sealing action which is an advantageous feature. During the suction stroke, the fluid pressure on the head is relieved and the piston ring is free to readjust itself to meet any changing condition in the piston or cylinder of the engine. It will also be clear that the form of connection which I have shown is simple and cheap in construction and yet well adapted for the performance of the objects to be attained. While I prefer this form of connection, it will be obvious that other forms of connection may be employed if desired.

While I have shown but one form of embodiment of my invention, yet it is obvious that various changes may be made therein without departure from the spirit of the invention.

I claim:

1. The combination of a piston ring and a piston having a body, a bodily movable head and connecting means between the body and head permitting the fluid pressure on the head to force the head against the ring and clamp it between the head and body without expanding the ring.

2. The combination of a piston having a body, a movable head and connecting means between said head and body adapted to permit free movement of the head toward the body and to limit movement of the head in the opposite direction, and a piston ring having parallel edges engaged by the head and body so that when fluid pressure is exerted on the head the ring is clamped in position without expanding it.

3. The combination of a piston having a body, a movable head, connecting means between the head and body comprising interlocking projections adapted to permit free movement of the head toward the body and to limit movement of the head in the opposite direction, and a piston ring between the head and body the engagement of the head against the piston ring being unrestrained by the connecting means.

4. The combination of a piston having a body, a movable head, connecting means between the head and body comprising interlocking projections adapted to permit free movement of the head toward the body and to limit movement of the head in the opposite direction, a piston ring between the head and body the engagement of the head against the piston ring being unrestrained by the connecting means, and means carried by said head and freely engaging said projections for preventing rotation of the head.

5. The combination of a piston having a body, a movable head, and connecting means between the head and body constructed to be connected by moving the head axially of the piston and then rotating one with respect to the other and also constructed to permit unrestrained movement of the head against the piston ring, and a piston ring between the head and body.

6. The combination of a piston having a body, a movable head, projections on the head, correspondingly shaped projections on the body adapted to be positioned under the projections on the body to limit movement of the head away from the body but permit unrestrained movement of the head against the piston ring, and a piston ring between the head and body.

7. The combination of a piston having a body, a movable head, projections on the head, correspondingly shaped projections on the body adapted to the position under the projections on the body to limit movement of the head away from the body but permit unrestrained movement of the head against the piston ring, a piston ring between the head and body, and means projecting through the head and coacting projection for preventing rotation of the head.

8. In a fluid-actuated piston, a ring-carrying groove, a piston ring in said groove, and fluid pressure-controlled means movable by being directly subjected to the fluid pressure acting on the piston for positively sealing the side edges of said ring in said groove without expansion of the ring when fluid pressure is acting on the top of the piston.

9. In a piston, a body, a head carried in spaced relation to said body to form a groove therebetween, the connection between said head and body being such as to provide a variable width groove, and a ring loosely mounted in said groove and adapted to be sealed in said groove to exclude pressure from the rear thereof by the fluid pressure acting on the top of the piston to move said head against said ring, the pressure exerted by said head also being adapted to prevent expansion of the ring during this pressure-acting period.

10. In a piston, a body having an open top with inwardly projecting horizontal flange segments, a head having a central support with horizontal flange segments at its end opposite the head, said head flange segments being adapted to pass between said body flange segments and to be rotated thereunder during assembly to permit reciprocation of said head relative to said body but to prevent its removal therefrom, a ring between said head and body, and means for maintaining the said assembled relation of said flange segments while permitting said reciprocatory movement.

In testimony whereof, I have subscribed my name.

MACY O. TEETOR.

CERTIFICATE OF CORRECTION.

Patent No. 1,789,570.  Granted January 20, 1931, to

MACY O. TEETOR.

It is hereby certified that error appears in the printed specification of the above numbered patent requiring correction as follows: Page 2, line 68, claim 7, for the words "the position" read be positioned; and that the said Letters Patent should be read with this correction therein that the same may conform to the record of the case in the Patent Office.

Signed and sealed this 24th day of February, A. D. 1931.

(Seal)

M. J. Moore,
Acting Commissioner of Patents.